United States Patent
Tsirkin (10) Patent No.: US 12,039,363 B2
(45) Date of Patent: Jul. 16, 2024

(54) SYNCHRONIZING CONCURRENT TASKS USING INTERRUPT DEFERRAL INSTRUCTIONS

(71) Applicant: Red Hat, Inc., Raleigh, NC (US)

(72) Inventor: Michael Tsirkin, Yokneam Illit (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/853,686

(22) Filed: Jun. 29, 2022

(65) Prior Publication Data

US 2024/0004696 A1     Jan. 4, 2024

(51) Int. Cl.
   *G06F 9/48*     (2006.01)
(52) U.S. Cl.
   CPC .......... *G06F 9/4831* (2013.01); *G06F 9/4887* (2013.01)
(58) Field of Classification Search
   CPC .. G06F 9/4831; G06F 9/4887; G06F 9/30076; G06F 9/4812; G06F 9/52; G06F 13/24
   See application file for complete search history.

(56) References Cited

U.S. PATENT DOCUMENTS

| | | | | |
|---|---|---|---|---|
| 6,000,029 | A * | 12/1999 | Moyer | G06F 9/4812 |
| | | | | 712/E9.046 |
| 6,792,492 | B1 | 9/2004 | Griffin | |
| 2005/0086650 | A1* | 4/2005 | Yates, Jr. | G06F 9/45533 |
| | | | | 712/229 |
| 2008/0059677 | A1* | 3/2008 | Archer | G06F 9/4812 |
| | | | | 710/262 |
| 2010/0191889 | A1* | 7/2010 | Serebrin | G06F 9/4812 |
| | | | | 718/1 |
| 2013/0326102 | A1* | 12/2013 | Marietta | G06F 13/24 |
| | | | | 710/262 |
| 2014/0108691 | A1 | 4/2014 | Kennedy et al. | |
| 2014/0201411 | A1* | 7/2014 | Kumar | G06F 9/4418 |
| | | | | 710/262 |

(Continued)

OTHER PUBLICATIONS

Bovet, et al. "Understanding the Linux Kernel, 3rd Edition." Nov. 2005, section titled "Interrupt Handling," 34 pages. https://www.oreilly.com/library/view/understanding-the-linux/0596005652/ch04s06.html.

(Continued)

*Primary Examiner* — Phong H Dang
(74) *Attorney, Agent, or Firm* — Dority & Manning, P.A.

(57) ABSTRACT

An example method may include responsive to receiving, by a processing device, an interrupt deferral instruction requesting that interrupts be deferred, disabling delivery of interrupts by the processing device, receiving one or more interrupt requests subsequent to disabling delivery of interrupts, and responsive to determining that a deferral termination criterion is satisfied, delivering one or more interrupts, wherein each of the one or more interrupts is specified by a respective one of the interrupt requests. The method may further include receiving a resume interrupt delivery instruction requesting that deferred and subsequent interrupts be delivered, wherein the deferral termination criterion is satisfied in response to receiving the resume interrupt delivery instruction. The method may further include, responsive to receiving the resume interrupt delivery instruction, enabling delivery of the one or more interrupts and subsequent interrupts by the processing device.

20 Claims, 6 Drawing Sheets

(56) References Cited

U.S. PATENT DOCUMENTS

2015/0074311 A1* 3/2015 McKenney .......... G06F 9/4812
    710/269
2015/0378792 A1* 12/2015 Shum ................... G06F 9/3865
    711/147
2016/0077987 A1 3/2016 Kumar et al.

OTHER PUBLICATIONS

The extended European search report for EP Application No. 22214211.9, dated Jun. 22, 2023, 8 pages.

* cited by examiner

SYNCHRONIZING CONCURRENT TASKS USING INTERRUPT DEFERRAL INSTRUCTIONS

TECHNICAL FIELD

The present disclosure is generally related to concurrent processing in computer systems, and more particularly, to synchronizing concurrent tasks using interrupt deferral instructions.

BACKGROUND

A computer system can perform multiple tasks concurrently using techniques such as multiprocessing, in which each task executes on a different processor, or time slicing, in which each task can execute on the same processor for a relatively short amount of time before yielding or being preempted by another task. The execution of the tasks can be managed by an operating system, which can preempt an executing task and cause another task to execute for a period of time.

A race condition can occur in a computer system if the system can behave in different ways when different sequences of events occur, and the system does not control the determination of which sequence occurs. The system's behavior depends on which of the possible sequences actually occurs. If one or more of the possible sequences can result in incorrect system behavior, then the race condition is a bug or defect in the system, and can potentially be exploited to cause the system to perform unauthorized operations.

If two concurrently-running tasks access a shared resource, e.g., one task modifies a data item in memory and the other task reads the data item from the memory and performs operations using the resulting value of the shared variable, then a race condition can occur. That is, the results produced by the tasks can depend on the order in which the read and write operations occur. A processor can execute concurrent tasks by executing some instructions of a first task, pre-empting (e.g., stopping) the first task, executing some instructions of a second task, pre-empting the second task, executing more instructions of the first task, and so on. Ordinarily, each concurrently-executing task can be pre-empted after executing any of its instructions, at which point another task may execute instructions, and the processor can continue switching between the tasks in this way. If a data item is read by a first task, and a second task executing concurrently with the first task writes a new value to the data item, then the first task might read either the old or new value of the data item. If the program code does not prevent the concurrent access by the two tasks, or does not handle each possible output correctly, then incorrect program behavior can occur. Each portions of the program code that accesses the shared data item is referred to herein as a "concurrency-sensitive section." A critical section can be protected so that it is not executed concurrently in two tasks or concurrently with another critical section that accesses the same shared resource in another task.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are systems and methods for synchronizing concurrent tasks using interrupt deferral instructions. Synchronization techniques can be used to protect a critical section of program code that should not be executed concurrently in multiple tasks. For example, a program code section that makes changes to a shared resource can cause unpredictable behavior if executed concurrently with program code in another task that access the shared resource. Program code can use such synchronization techniques to prevent more than one task from executing in a code section. Synchronization between concurrent tasks can be implemented using lock acquisition and release operations, for example. A task that reads a data value stored in memory, for example, can invoke a lock acquisition operation prior to reading the data item, and invoke a lock release operation subsequent to using the value read from the data item. A task that writes to the data item can invoke the lock acquisition operation prior to writing to the data item, and release the lock subsequent to writing to the data item During the time that a task holds a lock, the other tasks are prevented from acquiring the lock. Thus, the locking operations prevent the associated data item from being accessed (e.g., read or written) concurrently by more than one task. However, the locking operations can have substantial performance overhead, since each locking operation can involve invoking system calls or busy waiting. System calls can transfer execution to an operating system kernel, which can involve relatively inefficient operations such as causing processor interrupts and switching to the processor's privileged execution mode. Use of a system call to perform each locking operation can substantially reduce application performance. Busy waiting, which can be used as an alternative locking technique referred to as "spin lock", but busy waiting involve processing-intensive operations such as checking a variable repeatedly in a loop, and thus reduces application performance. The use of locks can be avoided by using other synchronization techniques, such as lockless data structures or read-copy-update operations that copy data prior to updating it. Such lockless synchronization techniques permit more than one task to access the data structure concurrently. However, lockless techniques can increase application code complexity while still reducing overall application performance. In applications that are performance-sensitive, For example, in applications that perform network packet processing, the overhead of locking operations using techniques such as system calls or other techniques described above can limit the rate at which packets can be processed.

Aspects of the present disclosure address the above and other deficiencies by providing an interrupt deferral system that can improve the efficiency of protecting critical sections in program code. An interrupt can be an action performed by a processor in response to an interrupt request. An interrupt request can be generated by, for example, an operating system, e.g., to pre-empt a current task and cause a different task to execute, by a hardware device, by another processor, or by a peripheral device to cause the processor to perform other time-sensitive operations. If the processor accepts an interrupt request, then the processor causes the requested interrupt to occur by performing operations referred to herein as "delivering" the interrupt. Delivering the interrupt can involve suspending the processor's current activities, e.g., by suspending currently-executing program code, saving the processor's state, and executing program code associated with the interrupt. The program code associated with the interrupt is referred to herein as an interrupt handler. Upon completion of the interrupt handler, the processor can resume its activities, e.g., by continuing to execute the program code that was suspended, or by executing a different task's program code.

Application program code can use the disclosed interrupt deferral system to cause a processor to efficiently defer interrupts during the time that an application is executing a critical section of program code. Since the operating system uses interrupts to pre-empt or otherwise pause the execution of program code, disabling interrupts can prevent concurrent execution of critical sections of the application that execute in multiple threads.

The interrupt deferral system can include a processor that provides one or more interrupt deferral instructions that an application can call to defer and re-enable delivery of interrupts. For example, the interrupt deferral instructions can include a "defer interrupts" instruction that the application can call to defer interrupts prior to entering a critical section, and a "resume interrupts" instruction that the application can call to resume delivery of interrupts after exiting the critical section.

The defer interrupts instruction can cause the processor to enter an interrupt deferral state in which interrupt requests are stored in a data structure, such as a list of deferred interrupt requests, instead of being delivered. The deferred interrupts can subsequently be delivered when a resume interrupts instruction is called, or when a timeout occurs. In contrast, when an instruction that disables interrupts without deferral, such as the cli (clear interrupts) instructions of X86 processors, has been called, interrupts generated by or sent to the processor are discarded and are not subsequently available to the application.

Since delivery of interrupts is temporarily disabled by the defer interrupts instruction, the application can execute a critical section safely, e.g., without another task being executed concurrently. The defer interrupts instruction can disable delivery of interrupts by the processor until a deferral termination condition is satisfied, and causes the processor to store interrupt requests that are received during the time that interrupts are disabled in a data structure. The defer interrupts instruction can also cause the processor to detect occurrence of a timeout and exit the interrupt deferral state if a timeout occurs. The processor can exit the interrupt deferral state by re-enabling delivery of interrupts and delivering interrupts specified by the interrupt requests that are stored in the data structure. A timeout can occur if, for example, a counter started by the defer interrupts instruction reaches a threshold timeout value. The processor can increment the counter at periodic time intervals or for each processor instruction executed, for example. In other examples, a timeout can occur if interrupts have been deferred for at least a threshold amount of time since execution of the defer interrupts instruction. The resume interrupts instruction can cause the processor to exit the interrupt deferral state by enabling delivery of subsequent interrupts and delivering the deferred interrupts, which are specified by the interrupt requests stored in the data structure.

Resuming delivery of interrupts after a threshold amount of time prevents interrupts from being deferred for more than a short period of time. If an application calls the resume interrupts instruction upon exiting a critical section, the processor re-enables interrupts when the timeout is detected, and the processor delivers deferred interrupts (if any) to the application. If the timeout criterion uses a threshold amount of time, the threshold amount of time can be, for example a fraction of a processor scheduling quota. The processor scheduling quota can be an amount of remaining time in a timeslice of a supervisor's scheduler for the application's task. The processor scheduling quota can be, for example, an amount of time for which the supervisor permits a task to execute prior to scheduling a different task for execution. The supervisor can provide the processor scheduling quota to the processor. The processor scheduling quota provided to the processor can be, for example, a total time available to the application's task in one timeslice (e.g., from the beginning to the end of a timeslice in which the task is scheduled to execute) or an amount of remaining time available to the application's task (e.g., from a current time during the timeslice to the end of the timeslice). For example, the processing quota can be a value between 1 millisecond and 1 second. If the processing quota is 10 milliseconds, then the threshold amount of time can be one-tenth of the processing quota, which is 1 millisecond. As another example, the threshold amount of time can be one-twentieth of the processing quota, e.g., 0.5 milliseconds. If the timeout criterion uses a threshold number of instructions executed, the threshold number can derived from a number of instructions that are expected to be executed in the critical section.

The systems and methods described herein include technical improvements to multithreaded processing technology. In particular, aspects of the present disclosure may improve the efficiency of synchronization operations used by different threads of execution to protect critical sections that should not be executed concurrently with other threads. Multiple threads of execution are often used in computer applications, and can enable an application to use multiple processors or processor cores to perform tasks concurrently. Synchronization operations, such as locking operations, can be implemented using processor instructions that defer interrupts to acquire a lock and re-enable interrupts to release a lock. The processor instructions can be executed with much lower latency than other techniques such as system calls or busy waiting, so using the interrupt deferral instruction(s) as disclosed can result in substantially higher application performance than would be achieved with the other techniques.

Various aspects of the above referenced methods and systems are described in details herein below by way of examples, rather than by way of limitation.

Figure 1:
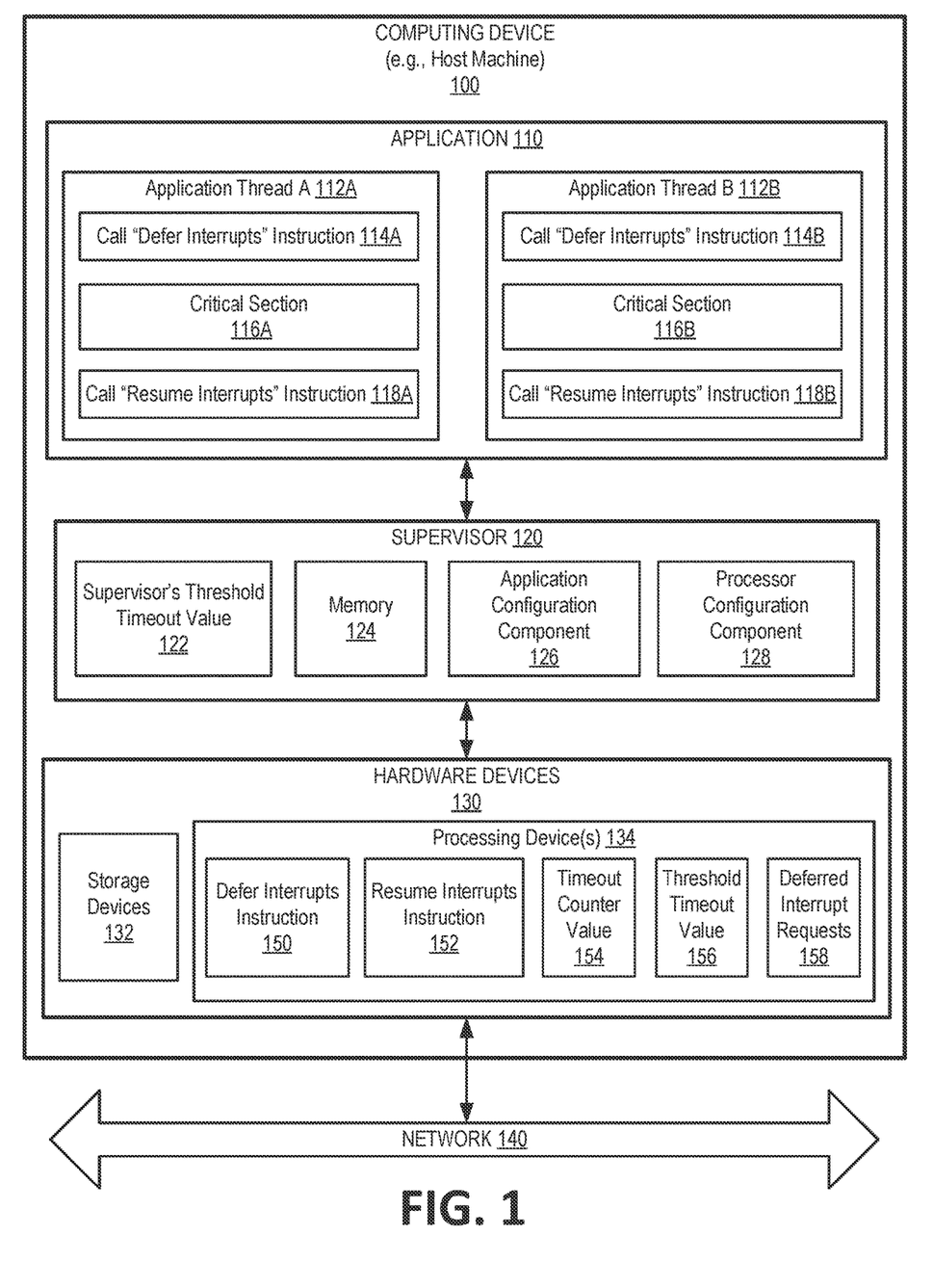
FIG. 1 depicts a high-level block diagram of an example computing system that can efficiently synchronize threads using interrupt deferral instructions, in accordance with one or more aspects of the present disclosure.

FIG. 1 depicts a high-level block diagram of an example computing system 100 that can efficiently synchronize threads 112 using an interrupt deferral instruction 150 and a resume interrupt delivery instruction 152 ("resume interrupts" instruction), in accordance with one or more aspects of the present disclosure. It should be noted that other architectures for computing device 100 are possible, and that the implementation of a computing device utilizing embodiments of the disclosure are not necessarily limited to the specific architecture depicted. Computing device 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computing device 100 may be a computing device implemented with x86 hardware. In another example, computing device 100 may be a computing device implemented with ARM®, PowerPC®, SPARC®, or other hardware. In the example shown in FIG. 1, computing device 100 may include application 110, supervisor 120, and hardware devices 130, and may communicate with other computing devices via a network 140.

Application 110 may be program code that is executed in a non-privileged mode of processing device(s) 134. Processing device 134 is also referred to herein as processors. Operations described herein as being performed by a processor can be performed by the computer system 100 and/or the processing device(s) 134. Execution of application 110 may be initiated and managed by a supervisor 120. Application 110 may cause application threads 112A, 112B to be created, e.g., by requesting the supervisor 120 to create the application threads 112 and providing program code that is executed by each application thread 112A, 112B.

Sections of the application program code that are concurrency-sensitive are shown as critical sections 116A, 116B. Critical sections 116 may be program code sections that access one or more shared resources. Shared resources may include, e.g., a shared memory region in memory 124 that is accessible to both application threads 112.

An application 110 can be modified to call a defer interrupts instruction 150 at block 114 prior to entering a critical section 116, and invoke a resume interrupts instruction 152 upon exiting the critical section 116. If multiple tasks (e.g., threads) share a processor 143, a task that is executing in a critical section is not pre-empted because interrupts are disabled. Upon exiting the critical section 116, the task re-enables interrupts at block 118, and the processor 134 can deliver any interrupts that occurred while the task was executing in the critical section to the application. The interrupts can include pre-emption interrupts, so the task can be pre-empted by the supervisor upon executing the interrupt re-enable instruction. When a task is pre-empted, another task can execute on the processor 134. If an application 110 does not enable interrupts by calling the resume-interrupts instruction logic 152 upon exiting a critical section 116, the processor 143 can enable interrupts when a timer or counter (e.g., a count of instructions executed) reaches the threshold value, and the processor can deliver deferred interrupts (if any) to the application 110.

In one example, each application thread 112A, 112B can execute the same program code instructions, e.g., critical section 116A may be the same program code as critical section 116B. In another example, each application thread 112A, 112B can execute different program code instructions, e.g., critical section 116A may have different program code than critical section 116B. In both examples, the processor may execute one or more instructions of application thread A 112A, followed by one or more instructions of application thread B 112B, followed by one or more instructions of application thread A 112A, and so on until both threads exit.

If one application thread 112A writes data to a shared memory region, and another application thread 112B reads data from the shared memory region without synchronization between the threads, then a race condition can exist. The portions of program code that access the shared memory region and have a race condition are shown as critical sections 116A, 116B. To eliminate the race condition, the critical sections 116A, 116B, can be protected by a call 114 a defer interrupts instruction 150 prior to the first instruction of the critical section 116 and a call 118 to a resume interrupts instruction 152 subsequent to the critical section 116 (e.g., as the next instruction in the program code after the critical section 116).

In the two application threads 112 shown in FIG. 1, application thread A 112A executes program code that includes a call 114A to a defer interrupts instruction 150, followed by a critical section 116A, which is followed by a call 118A to a resume interrupts instruction 152. Similarly, application thread B 112B executes program code that includes a call 114B to the defer interrupts instruction 150, followed by a critical section 116B, which is followed by a call 118B to the resume interrupts instruction 152. The program code of threads 112A, 112B executed first by the processor can be either the defer interrupts call 114A or the defer interrupts call 114B. For example, if the defer interrupts call 114A is executed first, then the defer interrupts instruction 150 defers interrupts, and the processor does not interrupt (e.g., pre-empt) application thread A 112A until after the resume interrupts call 118A. Thus, in this example, application thread B 112B does not execute until after the resume interrupts call 118A. The defer interrupts call 114A can cause the processor to disable interrupts and begin storing interrupt requests (if any) in a list of deferred interrupt requests 158, as described below.

Application thread A 112A continues to execute after the defer interrupts call 114A, and executes the critical section 116A followed by the resume interrupts call 118A. The critical section 116A can access (e.g., read from and/or write to) a shared memory region. Since interrupts are disabled during the time that the critical section 116A executes, the critical section 116A is not pre-empted to execute another thread. Since the critical section 116A can execute without being pre-empted to execute another thread that accesses the same shared memory region, the race condition does not occur in the critical section 116A.

Subsequent to executing the critical section 116A, the resume interrupts call 118A can call the resume interrupts instruction 152, which delivers any interrupts that were requested while interrupts were deferred, and enables delivery of any subsequently-requested interrupts. If any requests for interrupts were received during the time that the critical section 116A executes, then the requests are present in the list of deferred interrupt requests 158 as a result of being stored in the list by the processor. The call to the resume interrupts instruction 118A can deliver the interrupts specified by the requests that were stored in the deferred interrupt requests 158 during the time that interrupts were deferred. In this example, interrupts were deferred during the time between the defer interrupts call 114A and the resume interrupts call 118A. Delivery of subsequent interrupts was enabled by the call 118A to the resume interrupts instruction 118A, as described above.

The defer interrupts instruction 150 can cause the processor to detect occurrence of a timeout while the processor is in the deferral state and exit the interrupt deferral state if a timeout occurs. The processor can monitor or evaluate a timeout criterion over time. If the timeout criterion is satisfied, then a timeout has occurred. The processor can maintain a timeout counter value 154 that represents an amount of time, a count of executed instructions, or other quantity that corresponds to an amount of time that has elapsed since the processor entered the interrupt deferral state. The timeout counter value 154 can be stored in a processor register, for example, and can be incremented or updated by the processor at periodic intervals or at other suitable times while the timeout counter value 154 is less than a timeout threshold value 156 and the resume interrupts instruction 152 has not been called. Upon determining that the timeout counter value 154 is greater than or equal to the timeout threshold value 156, the processor can exit the interrupt deferral state. In one example, the processor can increment the counter for each processor instruction executed, or at periodic time intervals. The counter can be started in response to receiving the interrupt deferral instruction 152, or in response to disabling interrupts subsequent to receiving the interrupt deferral instruction. Thus, at a particular time, the current counter value can correspond to an amount of time for which the application task has been executing since receiving the interrupt deferral instruction.

The timeout criterion can be, for example, that the resume interrupts call 118A is not performed prior to the timeout counter value 154 reaching a threshold timeout value 156. In another example, the timeout counter value 154 can be initialized to the timeout threshold value 156, and the processor can decrement the counter while the timeout counter value 154 is greater than zero and the resume interrupts instruction 152 has not been called. Upon determining that the timeout counter value 154 is less than or equal to zero, the processor can exit the interrupt deferral state. In other examples, the timeout criterion can be that the resume interrupts call 118A is not performed within a threshold amount of time after the defer interrupts call 114A or within a threshold number of processor instructions being executed after the defer interrupts call 114A. The threshold amount of time or the threshold number of processor instructions can be specified by the timeout threshold value 156. The timeout threshold value 156 can be provided by the supervisor 120, and can be the same value as the supervisor's threshold timeout value 122, for example. In the case of processor instructions being counted, the timeout threshold value 156 can be a fraction of a processor scheduling quota associated with the processor or application, for example. Thus, the timeout threshold value 156 can be less than the processor scheduling quota. As an example, if the quota is an amount of time, the timeout threshold value 156 can be a fraction of the amount of time specified by the quota, such as the total time available to the application's task in one timeslice. In another example, the supervisor's threshold timeout value 122 (from which the processor's timeout counter value 154 is determined) can be a fraction of the amount of time (or processor instructions) remaining in the current timeslice of the application 110's task.

The timeout criterion be based on a timeout counter value 154, which can be stored in, e.g., a processor register or a memory location. The processor can increase the timeout counter value 154 over time, e.g., by incrementing the timeout counter value 154 at defined intervals. Alternatively or additionally, the processor can determine the timeout counter value 154 periodically over time, e.g., by computing a difference between a number of instructions that the processor has executed and a number of instructions that the processor had executed at the time the processor entered the interrupt deferral state. The timeout threshold value 156 can be a maximum number of instructions to be executed, or a multiple of a number of instructions to be executed prior to a timeout occurring. The supervisor 120 can retrieve the timeout threshold value 122 from configuration information and provide the timeout threshold value 122 to the processor via a configuration instruction or register. The supervisor can also notify the application 110 of the processor's ability to defer interrupts. The supervisor 120 can detect that a timeout has occurred by determining that the timeout counter value 154 is greater than or equal to the timeout threshold value 156.

Upon detecting that the timeout criterion is satisfied, the processor can perform a timeout action. The timeout action can include enabling interrupts and delivering the interrupts specified by the requests that were stored in the deferred interrupt requests 158 during the time that interrupts were deferred. Thus, the timeout action is similar to the operations performed by the resume interrupts instruction 152, and the processor can implement the timeout processing by calling the resume interrupts instruction 152 in response to detecting that the timeout criterion is satisfied.

Subsequent to enabling interrupts after the timeout criterion is satisfied, interrupts can be delivered to the supervisor 120 and the application 110. For example, when a processor scheduling quota associated with the application's task expires, a timer interrupt can occur. The supervisor 120 can receive the timer interrupt and determine that the application task has exceeded its scheduling time quota. The timer interrupt can also interrupt the application task.

Since interrupts are enabled subsequent to the call 118A to the resume interrupts instruction, the supervisor 120 can pre-empt application thread A 112A (if it has not exited) and execute application thread B 112B. Application thread B 112B includes a call 114B to the defer interrupts instruction 150, which disables interrupts and begins storing interrupt requests (if any) in a list of deferred interrupt requests 158. Application thread B 112B then executes a critical section 116B, which is not pre-empted by the processor to execute other threads (not shown) because interrupts are disabled.

Supervisor 120 may also be known as an operating system kernel, and may provide application 110 with access to one or more features of the underlying hardware devices 130. An operating system, which includes supervisor 120, can manage host memory 124 and hardware devices 130, including storage devices 132 and processing device(s) 134. In the example shown, supervisor 120 may run directly on the hardware of computing device 100, and may execute in a supervisor mode of processing device(s) 134. In other examples, supervisor 120 may run within a virtual machine (not shown), e.g., as a component of a guest operating system. Virtual machines may support hardware emulation, full virtualization, para-virtualization, operating system-level virtualization, or a combination thereof. Different virtual machines may have the same or different types of guest operating systems, such as Microsoft®, Windows®, Linux®, Solaris®, etc.

Supervisor 120 can include configuration data, such as a threshold timeout value 122. The threshold timeout value 122 can be a configurable parameter of the supervisor 130, and can be specified via a management interface or other configuration interface, for example. Supervisor 120 can also include an application configuration component 126, which can provide configuration information to the application 110. For example, the application configuration component 126 can send an indication to the application 110 that interrupt deferral is available, and the application 110 can call the interrupt deferral instructions 150, 152. Supervisor 10 can also include a processor configuration component 128, which can provide configuration information to the processing device(s) 134. For example, the processor configuration component 128 can provide the threshold timeout value 122 to the processing device(s) 134, which can store the value in memory as the timeout threshold value 156.

Memory 124 may be any virtual memory, logical memory, physical memory, other portion of memory, or a combination thereof for storing, organizing, or accessing data. Memory 124 may include a portion of memory of computing device 100 that is designated by supervisor 120 for use by supervisor 120 and a portion of memory of computing device 100 that is designated by supervisor 120 for use by application 110. Memory 124 may be managed by supervisor 120.

Storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, storage devices 132 may be physical memory and may include volatile memory devices (e.g., random access memory (RAM)), non-volatile memory devices (e.g., flash memory, NVRAM), and/or other types of memory devices. In another example, storage devices 132 may include one or more mass storage devices, such as hard drives, solid state drives (SSD)), other data storage devices, or a combination thereof. In a further example, storage devices 132 may include a combination of one or more memory devices, one or more mass storage devices, other data storage devices, or a combination thereof, which may or may not be arranged in a cache hierarchy with multiple levels.

Processing devices 134 ("processors") may include one or more processors that are capable of executing computing tasks. Computing tasks can include threads of execution, such as application threads 112. Each processor 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, processors 134 may be implemented as a single integrated circuit, two or more integrated circuits, or may be a component of a multi-chip module (e.g., in which individual microprocessor dies are included in a single integrated circuit package and hence share a single socket). A processing device may also be referred to as a central processing unit ("CPU").

Network 140 may be a public network (e.g., the internet), a private network (e.g., a local area network (LAN), a wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
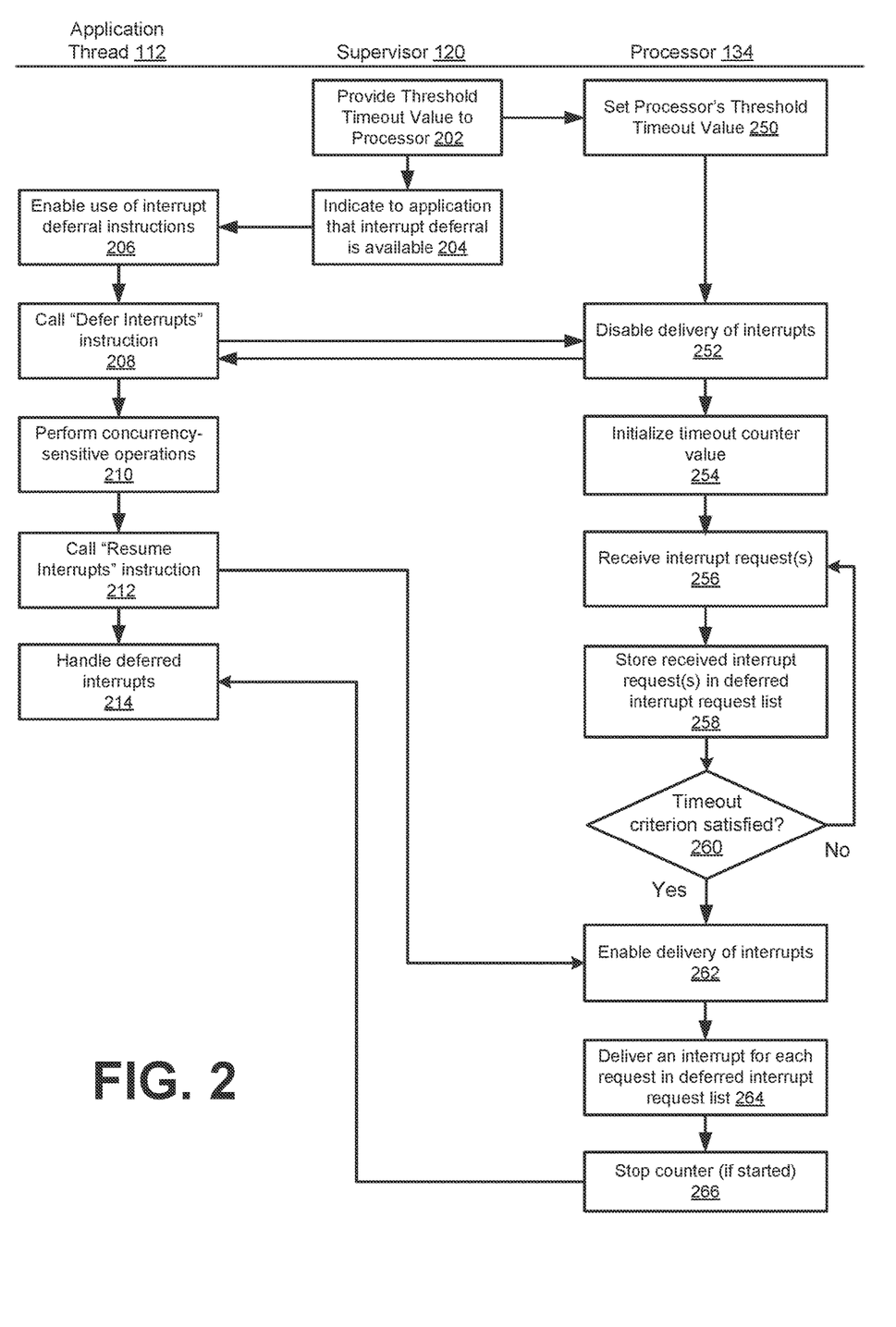
FIG. 2 depicts an interaction diagram showing example operations performed by an application, supervisor, and processor to protect a critical section of the application in accordance with one or more aspects of the present disclosure.

FIG. 2 depicts an interaction diagram showing example operations performed by an application 110, supervisor 120, and processor 134 to protect a critical section 116 of the application 110 in accordance with one or more aspects of the present disclosure. The interaction diagram of FIG. 2 shows an example interaction in which an application thread 112, after executing instructions that are not concurrency-sensitive, calls a defer interrupts instruction (block 208), performs concurrency-sensitive operations (210), e.g., operations in a critical section, calls a resume interrupts instruction (block 212), and handles deferred interrupts directed to the application that were requested during the time that interrupts were deferred (e.g., between the defer interrupts call and the resume interrupts call) (block 214). After calling the resume interrupts instruction, the application thread 112 can continue executing instructions that are not concurrency-sensitive (e.g., not part of a critical section).

The example interaction begins at block 202, in which the supervisor 120 provides a threshold timeout value 122 to the processing device 134. At block 250, the processing device 134 sets an internal timeout threshold value 156 to the threshold timeout value 122 received from the supervisor 120. The internal timeout threshold value 156 may be a threshold value of the counter, for example, or other value as described above. At block 204, the supervisor 120 may indicate to the application that interrupt deferral is available, e.g., that the processor 134 provides a defer interrupts instruction 150 and a resume interrupts instruction 152 that the application 110 can call to defer and resume interrupts, respectively. Alternatively, the processor 134 can provide a single interrupt deferral instruction having an operand that indicates whether interrupts are to be deferred or resumed. At block 206, the application thread 112 may enable use of the interrupt deferral instructions in response to receiving the indication that interrupt deferral is available. As an alternative to blocks 204 and 206, the processor 134 can enable interrupts for each application by default or if a processor-level configuration parameter has been set to indicate that interrupt deferral instructions are to be enabled, in which case the processor need not perform block 204, and the application need not perform block 206.

At block 208, the application thread 112 may call the defer interrupts instruction 150, thereby causing the processor 134 to execute the defer interrupts instruction 150. The processor 134 begins executing the defer interrupts instruction 150 at block 252 by disabling delivery of interrupts. Although the delivery of interrupts is disabled, the processor can still receive interrupt requests, which the processor can store in a data structure. The processor 134 can disable delivery of interrupts by, for example, determining whether the processor 134 is in the deferred interrupts state prior to delivering an interrupt. If interrupts are deferred, the processor 134 can store the interrupt request in a data structure without delivering the interrupt. I.

The defer interrupts instruction 150 may return control to the application thread 112 after disabling delivery of interrupts. After executing the defer interrupts instruction at block 208, the application thread 112 may continue by performing concurrency-sensitive operations 210. Concurrently with the application thread 112's execution, the processor may continue performing operations that implement interrupt deferral, such as blocks 254-266.

An interrupt directed to the application 110 may be, for example an interrupt for which the handler program code is a portion of the application's program code. The interrupt may be a hardware interrupt generated by a hardware device 130, an inter-processor-interrupt (WI), a processor-generated interrupt, such as a task context switch interrupt, a page fault interrupt, or other type of interrupt.

At operation 254, the processor 134 may initialize a timeout counter value 154. For example, if the timeout counter value 154 represents an amount of time, the timeout counter value 154 may be set to a current time or other value (e.g., zero) that can be compared to a subsequent time to determine whether the difference is greater than the timeout threshold value 156. If the timeout counter value 154 represents a count of executed instructions, then operation 254 may set the timeout counter value 154 to an initial number of instructions, e.g., zero. The CPU may then increment the timeout counter value 154 for each instruction executed. Upon detecting that the timeout counter value 154 exceeds a threshold number of instructions, the processor may determine, at operation 260, that a timeout criterion is satisfied, and cause the processor to exit the interrupt deferral state by enabling delivery of interrupts (block 262), delivering interrupts specified by requests that were stored in the deferred interrupt requests 158 during the time that interrupts were deferred (block 264), and stopping the instruction counter or other counter, if appropriate (block 266). The processor can enable interrupts by executing a processor instruction, e.g., the sti (store interrupt flag) instruction on X86 processors Block 260, which determines whether the timeout criterion is satisfied, may be executed at any time after the defer interrupts instruction is called (e.g., after block 252 or after block 254). Block 260 may be executed prior to the processor entering the deferral state (e.g., prior to enabling delivery of interrupts at block 262 or prior to delivering deferred interrupts at block 264).

Subsequent to disabling delivery of interrupts at block 252, the processor can perform interrupt deferral operations by receiving one or more interrupt requests at block 256 and storing the received interrupt requests in a deferred interrupt request list or other suitable data structure. The processor can execute block 256 in response to each interrupt sent to the processor. Thus, although the interrupt deferral operations (blocks 256 and 258) are shown as being performed between blocks 254 and 260, the interrupt deferral operations may be executed at other times.

Alternatively, operation 254 may set the timeout counter value 154 to a threshold number of instructions to be executed while the processor is in the interrupt deferral state. The threshold number of instructions may be specified by the timeout threshold value 156.

If the application thread 112 calls the resume interrupts instruction prior to the timeout criterion being satisfied (e.g., prior to a timeout occurring), then the processor exits the interrupt deferral state by enabling delivery of interrupts (block 262), delivering an interrupt for each interrupt request in the deferred interrupt request list (block 264), and stopping the instruction counter or other counter, if appropriate (block 266). Subsequent to calling the resume interrupts instruction at block 212, the application thread 112 may handle deferred interrupts at block 214. The deferred interrupts may be delivered to the application thread 112 by the processor at block 264, e.g., in response to the timeout criterion being satisfied (block 260) or the resume interrupts instruction being called (block 212)

Figure 3:
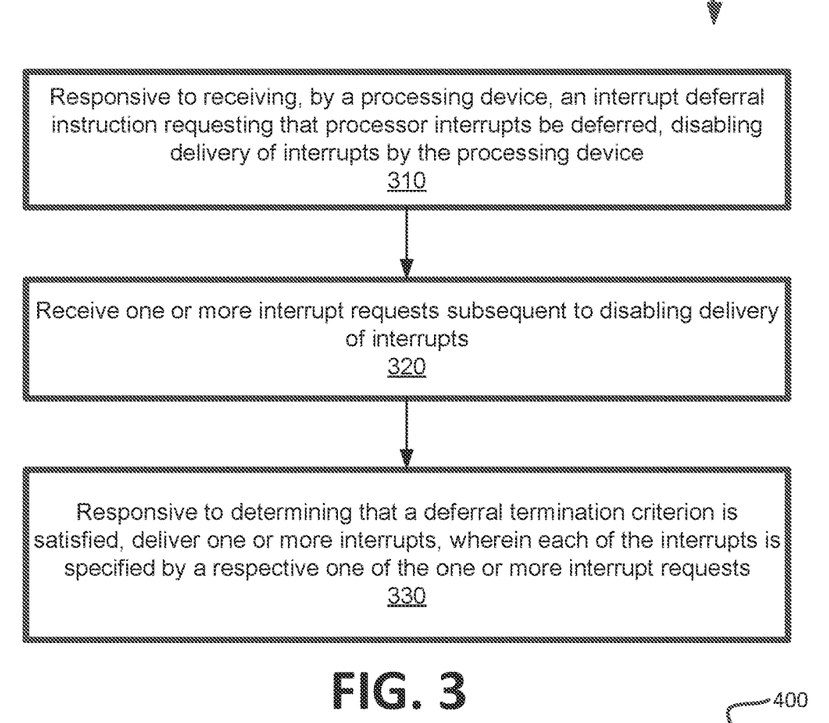
FIG. 3 depicts a flow diagram of an example method for an interrupt deferral instruction to defer interrupts, in accordance with one or more aspects of the present disclosure.

FIG. 3 depicts a flow diagram of an example method for an interrupt deferral instruction to defer interrupts, in accordance with one or more aspects of the present disclosure. Method 300 and each of its individual functions, routines, subroutines, or operations may be performed by one or more processors of a computing device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a computing device 100 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 300 may be performed by processing devices of a server device or a client device and may begin at block 310. At block 310, a computing device 100 may, responsive to receiving, by a processing device, an interrupt deferral instruction requesting that processor interrupts be deferred, disabling delivery of interrupts by the processing device. At block 320, the computing device 100 may receive one or more interrupt requests subsequent to disabling delivery of interrupts. At block 330, the computing device 100 may, responsive to determining that a deferral termination criterion is satisfied, deliver one or more interrupts, wherein each of the interrupts is specified by a respective one of the one or more interrupt requests. Responsive to completing the operations described herein above with reference to block 330, the method may terminate.

Figure 4:
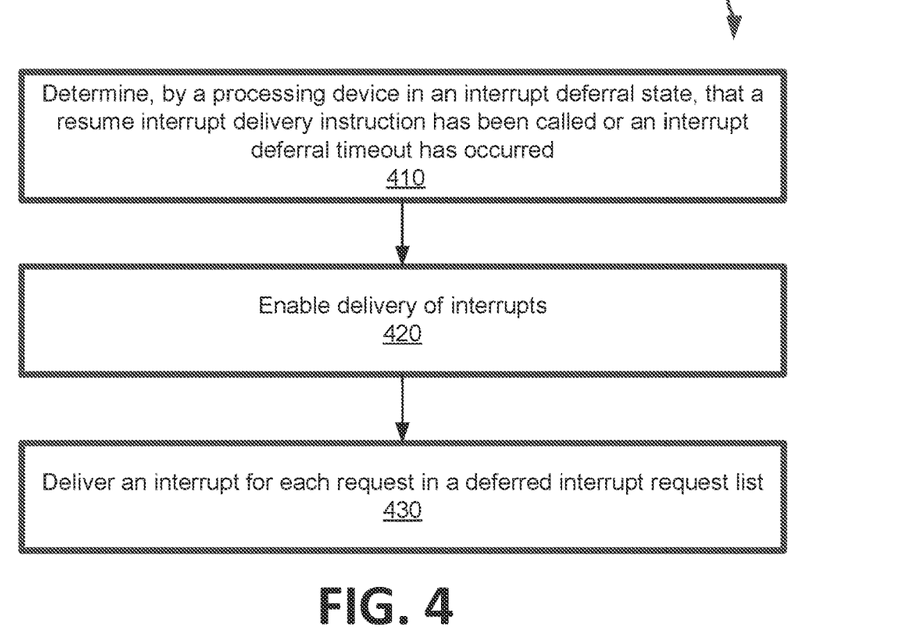
FIG. 4 depicts a flow diagram of an example method for exiting an interrupt deferral state of a processing device, in accordance with one or more aspects of the present disclosure.

FIG. 4 depicts a flow diagram of an example method for exiting an interrupt deferral state of a processing device, in accordance with one or more aspects of the present disclosure. Method 400 and each of its individual functions, routines, subroutines, or operations may be performed by one or more processors of the computing device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by a computing device 100 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 400 may be performed by processing devices of a server device or a client device and may begin at block 410. At block 410, a computing device 100 may determine that a resume interrupt delivery instruction has been called by a processor in an interrupt deferral state or an interrupt deferral timeout has occurred. At block 420, the computing device 100 may enable delivery of interrupts by the processor. At block 430, the processor may transition into the interrupt delivery enabled state and deliver an interrupt for each request in a deferred interrupt request list. Responsive to completing the operations described herein above with reference to block 430, the method may terminate.

Figure 5:
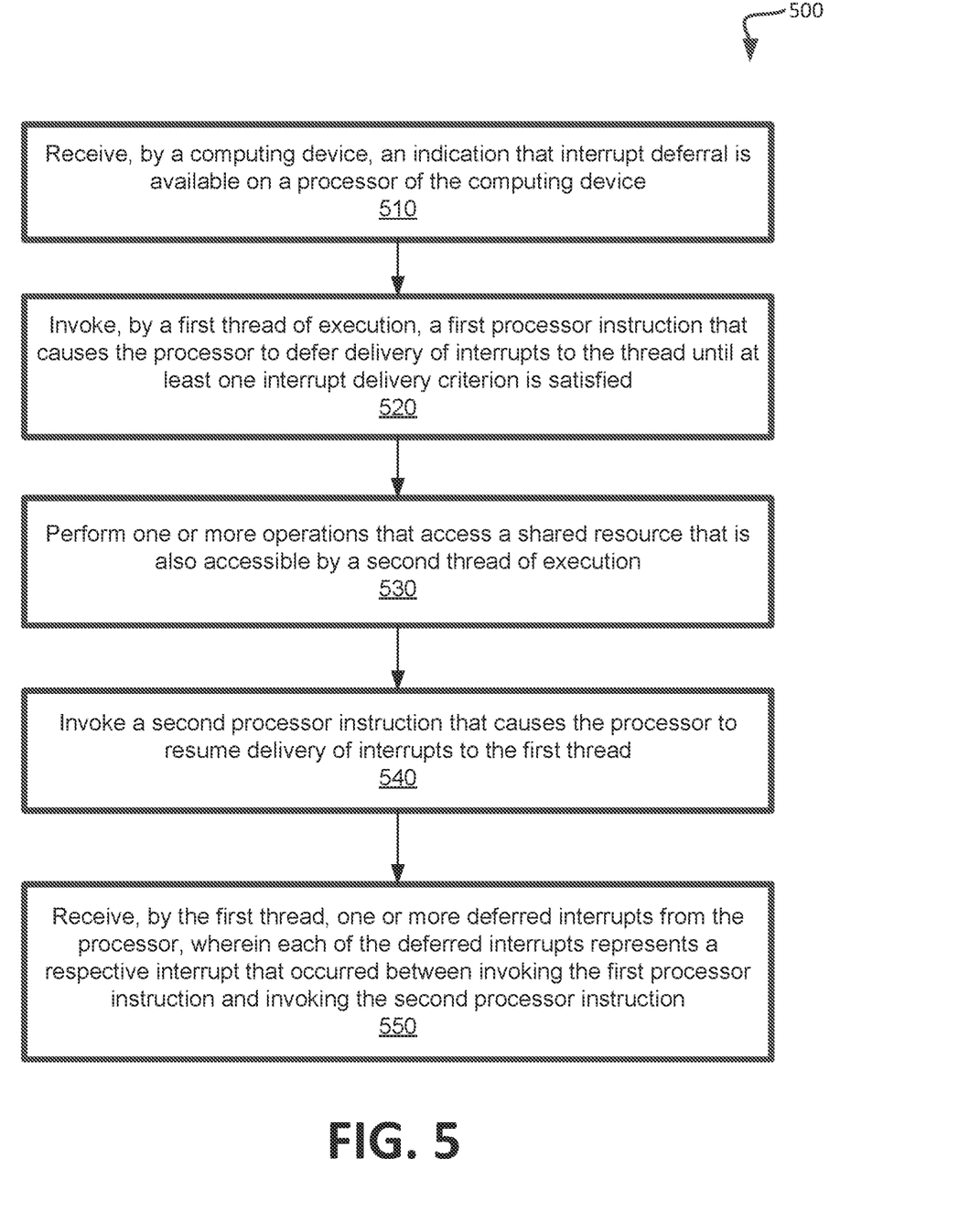
FIG. 5 depicts a flow diagram of an example method for an application to protect a critical section using interrupt deferral instructions, in accordance with one or more aspects of the present disclosure.

FIG. 5 depicts a flow diagram of an example method for an application to protect a critical section using interrupt deferral instructions, in accordance with one or more aspects of the present disclosure. Method 500 and each of its individual functions, routines, subroutines, or operations may be performed by one or more processors of the computing device executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processes implementing method 500 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 500 may be performed by a computing device 100 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 500 may be performed by processing devices of a server device or a client device and may begin at block 510. At block 510, a computing device 100 may receive an indication that interrupt deferral is available on a processor of the computing device. At block 520, the computing device 100 may invoke, by a first thread of execution, a first processor instruction that causes the processor to defer delivery of interrupts to the thread until at least one interrupt delivery criterion is satisfied. At block 530, the computing device 100 may perform one or more operations that access a shared resource that is also accessible by a second thread of execution. For example, the operations performed at block 530 can correspond to a critical section.

At block 540, the computing device 100 may invoke a second processor instruction that causes the processor to resume delivery of interrupts to the first thread. At block 550, the computing device 100 may receive, by the first thread, one or more deferred interrupts from the processor, wherein each of the deferred interrupts represents a respective interrupt that occurred between invoking the first processor instruction and invoking the second processor instruction. Responsive to completing the operations described herein above with reference to block 550, the method may terminate.

Figure 6:
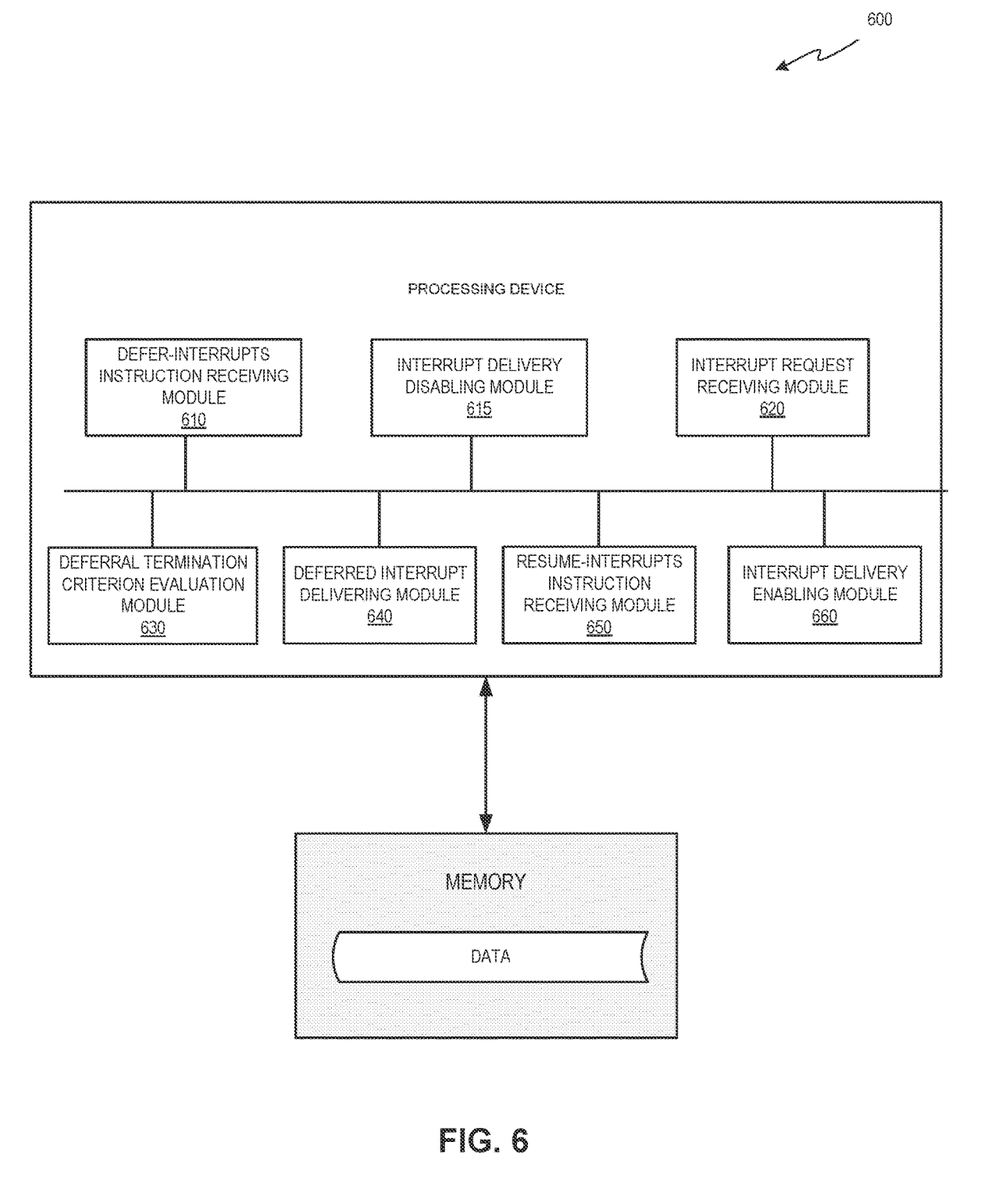
FIG. 6 depicts a block diagram of an example computing device in accordance with one or more aspects of the present disclosure.

FIG. 6 depicts a block diagram of a computer system 600 operating in accordance with one or more aspects of the present disclosure. Computer system 600 may be the same or similar to computing device 100 of FIG. 1, and may include one or more processors and one or more memory devices. In the example shown, computer system 600 may include a defer interrupts instruction receiving module 610, an interrupt delivery disabling module 615, an interrupt request receiving module 620, a deferral termination criterion evaluation module 630, a deferred interrupt delivering module 640, a resume interrupts instruction receiving module 650, and an interrupt delivery enabling module 660.

Defer interrupts instruction receiving module 610 may enable a processor to receive a defer interrupts instruction requesting that interrupts be deferred. The defer interrupts instruction and the resume interrupts instruction received by module 650 may be instructions in the processor's instruction set. Interrupt delivery disabling module 615 may enable the processor to, responsive to receiving, by a processing device, the defer interrupts instruction, disable delivery of interrupts by the processing device.

Interrupt request receiving module 620 may enable the processor to receive one or more interrupt requests subsequent to disabling delivery of interrupts. The processor may store each of the interrupt requests in a data structure, e.g., a list of deferred interrupts requests. Deferral termination criterion evaluation module 630 may enable the processor to determine that a deferral termination criterion is satisfied. The deferral termination criterion may be evaluated by determining, based on a numeric difference value that corresponds to an amount of time that has elapsed since receiving the defer interrupts instruction, whether a timeout criterion is satisfied. The timeout criterion may be satisfied if the numeric difference value exceeds a threshold timeout value. In one example, the numeric difference value may be determined from a difference between a current time and a time at which interrupt delivery was disabled. In another example, the numeric difference value may correspond to a number of instructions executed by the processing device since disabling delivery of interrupts.

Deferred interrupt delivering module 640 may enable the processor to, responsive to determining that the deferral termination criterion is satisfied, deliver one or more interrupts, wherein each of the interrupts is specified by a respective one of the interrupt requests. The interrupts requests may be retrieved from the data structure in which they were stored (as described above).

Resume interrupts instruction receiving module 650 may enable the processor to receive a resume interrupts instruction requesting that deferred and subsequent interrupts be delivered. The deferral termination criterion may be satisfied in response to receiving the resume interrupts instruction. Interrupt delivery enabling module 660 may enable the processor to, responsive to receiving the resume interrupts instruction, enable delivery of interrupts by the processing device. The defer interrupts instruction and the resume interrupts instruction may be instructions in the processing device's instruction set.

Figure 7:
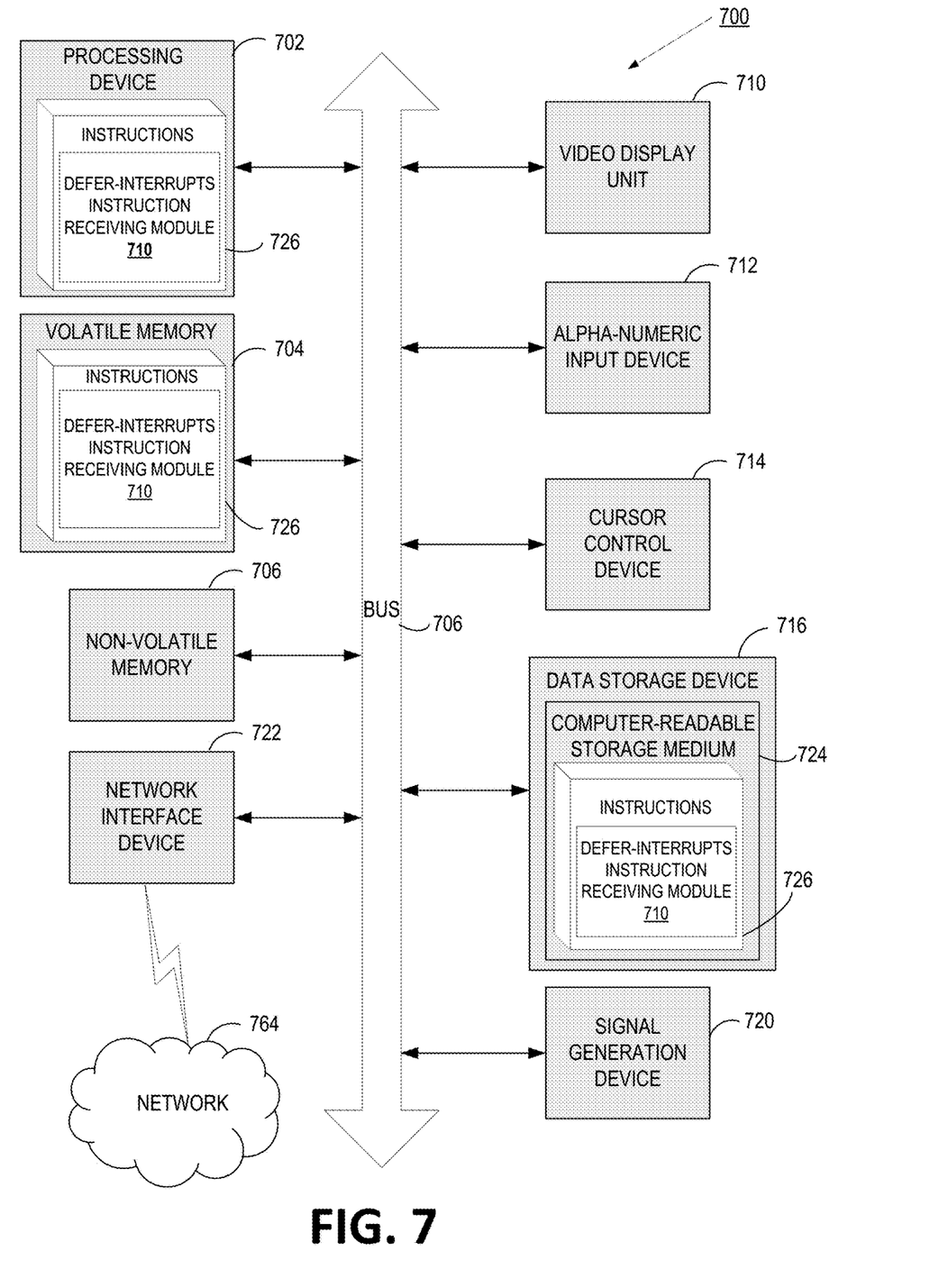
FIG. 7 depicts a block diagram of an illustrative computing device operating in accordance with the examples of the present disclosure.

FIG. 7 depicts a block diagram of a computer system operating in accordance with one or more aspects of the present disclosure. In various illustrative examples, computer system 700 may correspond to computing device 100 of FIG. 1. Computer system 700 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing method 400 or 500.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 400 or 500 and/or each of its individual functions, routines, subroutines, or operations. Examples of the structure for a variety of these systems are set forth in the description above.

Example 1 is a method comprising: responsive to receiving, by a processing device, a first interrupt deferral instruction requesting that interrupts be deferred, disabling delivery of interrupts by the processing device; receiving one or more interrupt requests subsequent to disabling delivery of interrupts; and responsive to determining that a deferral termination criterion is satisfied, delivering one or more interrupts, wherein each of the interrupts is specified by a respective one of the interrupt requests.

Example 2 is the method of example 1, further comprising: receiving a second interrupt deferral instruction requesting that deferred and subsequent interrupts be delivered, wherein the deferral termination criterion is satisfied in response to receiving the second interrupt deferral instruction.

Example 3 is the method of example 2, further comprising: responsive to receiving the second interrupt deferral instruction, enabling delivery of interrupts by the processing device.

Example 4 is the method of example 2, wherein the first interrupt deferral instruction is in the processing device's instruction set and is called with a parameter specifying interrupt delivery is to be deferred, and the second interrupt deferral instruction is in the processing device's instruction set and is called with a parameter specifying that interrupt delivery is to resume.

Example 5 is the method of example 2, wherein the first interrupt deferral instruction in the processing device's instruction set, and the first interrupt deferral instruction, upon being executed, causes interrupt delivery to be deferred, and the second interrupt deferral instruction is in the processing device's instruction set, and the second interrupt deferral instruction, upon being executed, causes interrupt delivery to resume.

Example 6 is the method of example 2, wherein the first and second interrupt deferral instructions are called by program code executing in an unprivileged mode of the processing device.

Example 7 is the method of example 1, wherein delivering the one or more interrupts comprises invoking, for each of the one or more interrupt requests, a respective interrupt handler associated with the interrupt request.

Example 8 is the method of example 1, further comprising: determining, in view of a numeric difference value that corresponds to an amount of time that has elapsed since receiving the first interrupt deferral instruction, whether a timeout criterion is satisfied, wherein the deferral termination criterion is satisfied if the timeout criterion is satisfied.

Example 9 is the method of example 8, wherein the timeout criterion is satisfied if the numeric difference value exceeds a threshold timeout value.

Example 10 is the method of example 9, wherein the numeric difference value is determined in view of a current counter value and a threshold counter value, wherein the current counter value corresponds to an amount of time for which the application task has been executing since receiving the interrupt deferral instruction, and wherein the threshold counter value is received from an operating system supervisor.

Example 11 is the method of example 10, wherein the threshold counter value is determined by the operating system supervisor in view of an amount of time in a timeslice of an application task.

Example 12 is the method of example 8, wherein the numeric difference value is determined in view of a difference between a current time and a time at which interrupt delivery was disabled.

Example 13 is the method of example 8, wherein the numeric difference value corresponds to a number of instructions executed by the processing device since disabling delivery of interrupts.

Example 14 is the method of example 1, wherein the one or more interrupt requests are received while interrupts are disabled.

Example 15 is the method of example 1, further comprising: storing each of the one or more interrupt requests in a data structure, wherein delivering the one or more interrupts comprises retrieving the one or more interrupt requests from the data structure.

Example 16 is a non-transitory machine-readable storage medium storing instructions that cause a processing device to perform operations comprising: invoking, by a first thread of execution on a processing device, a defer interrupts instruction that causes a processing device to defer delivery of interrupts until at least one deferral termination criterion is satisfied; and performing one or more operations that access a shared resource that is also accessible by a second thread of execution.

Example 17 is the non-transitory machine-readable storage medium of example 16, wherein the defer interrupts instruction is an instruction of the processing device's instruction set.

Example 18 is the non-transitory machine-readable storage medium of example 16, further comprising: invoking, by the first thread, a resume interrupts instruction that causes the processing device to resume delivery of interrupts; and receiving, by the first thread, one or more deferred interrupts from the processing device, wherein each of the deferred interrupts was requested between the invoking the defer interrupts instruction and the invoking the resume interrupts instruction.

Example 19 is the non-transitory machine-readable storage medium of example 16, wherein the deferral termination criterion is satisfied in response to receiving the defer interrupts instruction.

Example 20 is the non-transitory machine-readable storage medium of example 16, wherein the deferral termination criterion is satisfied if an amount of time that has elapsed since invoking the defer interrupts instruction is at least a threshold timeout value.

Example 21 is the non-transitory machine-readable storage medium of example 16, further comprising: receiving, by the first thread, subsequent to an expiration of a timeout period, one or more deferred interrupts from the processing device, wherein each of the deferred interrupts was requested between the invoking the defer interrupts instruction and the expiration of the timeout period.

Example 22 is the non-transitory machine-readable storage medium of example 21, wherein receiving one or more deferred interrupts comprises executing program code instructions of an interrupt handler for each deferred interrupt.

Example 23 is the non-transitory machine-readable storage medium of example 16, further comprising: prior to invoking, by a first thread of execution, receiving, by the processing device, an indication that interrupt deferral is available on the processing device.

Example 24 is a system comprising: a memory device; and a processing device, operatively coupled to the memory device, to perform operations comprising: responsive to receiving, by a processing device, a first interrupt deferral instruction requesting that interrupts be deferred, disabling delivery of interrupts by the processing device; receiving one or more interrupt requests subsequent to disabling delivery of interrupts; and responsive to determining that a deferral termination criterion is satisfied, delivering one or more interrupts, wherein each of the interrupts is specified by a respective one of the interrupt requests; receiving a second interrupt deferral instruction requesting that deferred and subsequent interrupts be delivered, wherein the deferral termination criterion is satisfied in response to receiving the second interrupt deferral instruction.

Example 25 is the system of example 24, further comprising: responsive to receiving the second interrupt deferral instruction, enabling delivery of interrupts by the processing device.

Example 26 is the system of example 24, wherein the first interrupt deferral instruction is in the processing device's instruction set and is called with a parameter specifying interrupt delivery is to be deferred, and the second interrupt deferral instruction is in the processing device's instruction set and is called with a parameter specifying that interrupt delivery is to resume.

Example 27 is the system of example 24, wherein the first interrupt deferral instruction in the processing device's instruction set, and the first interrupt deferral instruction, upon being executed, causes interrupt delivery to be deferred, and the second interrupt deferral instruction is in the processing device's instruction set, and the second interrupt deferral instruction, upon being executed, causes interrupt delivery to resume.

Example 28 is the system of example 24, further comprising: determining, in view of a numeric difference value that corresponds to an amount of time that has elapsed since receiving the first interrupt deferral instruction, whether a timeout criterion is satisfied, wherein the deferral termination criterion is satisfied if the timeout criterion is satisfied.

Example 29 is a method comprising: invoking, by a first thread of execution on a processing device, a defer interrupts instruction that causes a processing device to defer delivery of interrupts until at least one deferral termination criterion is satisfied; performing one or more operations that access a shared resource that is accessible by a second thread of execution; and invoking, by the first thread, a resume interrupts instruction that causes the processing device to resume delivery of interrupts; and receiving, by the first thread, one or more deferred interrupts from the processing device, wherein each of the deferred interrupts was requested between the invoking the defer interrupts instruction and the invoking the resume interrupts instruction.

Example 30 is the method of example 29, wherein the defer interrupts instruction is an instruction of the processing device's instruction set.

Example 31 is the method of example 29, wherein receiving one or more deferred interrupts comprises executing program code instructions of an interrupt handler for each deferred interrupt.

Example 32 is the method of example 29, wherein the deferral termination criterion is satisfied in response to receiving the defer interrupts instruction.

Example 33 is the method of example 29, wherein the deferral termination criterion is satisfied if an amount of time that has elapsed since invoking the defer interrupts instruction is at least a threshold timeout value.

Example 34 is the method of example 29, further comprising: receiving, by the first thread, subsequent to an expiration of a timeout period, one or more deferred interrupts from the processing device, wherein each of the deferred interrupts was requested between the invoking the defer interrupts instruction and the expiration of the timeout period.

Example 35 is an apparatus comprising: a means for, responsive to receiving, by a processing device, a defer interrupts instruction requesting that interrupts be deferred, disabling delivery of interrupts by the processing device; means for receiving one or more interrupt requests subsequent to disabling delivery of interrupts; means for, responsive to determining that a deferral termination criterion is satisfied, delivering one or more interrupts, wherein each of the interrupts is specified by a respective one of the interrupt requests; means for receiving a resume interrupts instruction requesting that deferred and subsequent interrupts be delivered, wherein the deferral termination criterion is satisfied in response to receiving the resume interrupts instruction; and means for, responsive to receiving the resume interrupts instruction, enabling delivery of subsequent interrupts by the processing device.

Example 36 is the apparatus of example 34, wherein the defer interrupts instruction and the resume interrupts instruction are instructions in the processing device's instruction set.

Example 37 is the apparatus of example 34, wherein the first interrupt deferral instruction, upon being executed, causes interrupt delivery to be deferred, and the second interrupt deferral instruction, upon being executed, causes interrupt delivery to resume.

Example 38 is the apparatus of example 34, wherein the defer interrupts instruction and the resume interrupts instruction are called by program code executing in an unprivileged mode of the processing device.

Example 39 is the apparatus of example 34, wherein the means for delivering the one or more interrupts comprises means for invoking, for each of the one or more interrupt requests, a respective interrupt handler associated with the interrupt request.

Example 40 is the apparatus of example 34, further comprising: means for determining, in view of a numeric difference value that corresponds to an amount of time that has elapsed since receiving the defer interrupts instruction, whether a timeout criterion is satisfied, wherein the deferral termination criterion is satisfied if the timeout criterion is satisfied.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
responsive to receiving, by a processing device, an interrupt deferral instruction requesting that interrupts be deferred, disabling delivery of interrupts by the processing device;
receiving one or more interrupt requests subsequent to disabling delivery of interrupts; and
responsive to determining that a deferral termination criterion is satisfied, delivering one or more interrupts, wherein each of the one or more interrupts is specified by a respective one of the interrupt requests, and wherein the deferral termination criterion is satisfied if an execution time of an application since receiving the interrupt deferral instruction exceeds a predefined fraction of a scheduling quota associated with the application.

2. The method of claim 1, further comprising:
receiving a resume interrupt delivery instruction requesting that deferred and subsequent interrupts be delivered, wherein the deferral termination criterion is satisfied in response to receiving the resume interrupt delivery instruction.

3. The method of claim 2, further comprising:
responsive to receiving the resume interrupt delivery instruction, enabling delivery of the one or more interrupts and subsequent interrupts by the processing device.

4. The method of claim 2, wherein the interrupt deferral instruction and the resume interrupt delivery instruction are called by program code executing in an unprivileged mode of the processing device.

5. The method of claim 1, further comprising:
determining, in view of a numeric difference value that corresponds to an amount of time that has elapsed since receiving the interrupt deferral instruction, whether a timeout criterion is satisfied, wherein the deferral termination criterion is satisfied if the timeout criterion is satisfied.

6. The method of claim 5, wherein the timeout criterion is satisfied if the numeric difference value exceeds a threshold timeout value.

7. The method of claim 5, wherein the numeric difference value is determined in view of a current counter value and a threshold counter value, wherein the current counter value corresponds to an amount of time for which the application has been executing since receiving the interrupt deferral instruction, and wherein the threshold counter value is received from an operating system supervisor.

8. The method of claim 5, wherein the numeric difference value is determined in view of a difference between a current time and a time at which interrupt delivery was disabled.

9. The method of claim 5, wherein the numeric difference value corresponds to a number of instructions executed by the processing device since disabling delivery of interrupts.

10. The method of claim 1, further comprising:
storing each of the one or more interrupt requests in a data structure, wherein delivering the one or more interrupts comprises retrieving the one or more interrupt requests from the data structure.

11. A non-transitory machine-readable storage medium storing instructions that cause a processing device to perform operations comprising:
responsive to receiving an interrupt deferral instruction requesting that interrupts be deferred, disabling delivery of interrupts by the processing device;
receiving one or more interrupt requests subsequent to disabling delivery of interrupts; and
responsive to determining that a deferral termination criterion is satisfied, delivering one or more interrupts, wherein each of the one or more interrupts is specified by a respective one of the interrupt requests, and wherein the deferral termination criterion is satisfied if an execution time of an application since receiving the interrupt deferral instruction exceeds a predefined fraction of a scheduling quota associated with the application.

12. The non-transitory machine-readable storage medium of claim 11, the operations further comprising:
receiving a resume interrupt delivery instruction requesting that deferred and subsequent interrupts be delivered, wherein the deferral termination criterion is satisfied in response to receiving the resume interrupt delivery instruction.

13. The non-transitory machine-readable storage medium of claim 12, the operations further comprising:
responsive to receiving the resume interrupt delivery instruction, enabling delivery of the one or more interrupts and subsequent interrupts by the processing device.

14. The non-transitory machine-readable storage medium of claim 12, wherein the interrupt deferral instruction and the resume interrupt delivery instruction are called by program code executing in an unprivileged mode of the processing device.

15. The non-transitory machine-readable storage medium of claim 11, the operations further comprising:
determining, in view of a numeric difference value that corresponds to an amount of time that has elapsed since receiving the interrupt deferral instruction, whether a timeout criterion is satisfied,
wherein the deferral termination criterion is satisfied if the timeout criterion is satisfied.

16. A system comprising:
a memory device; and
a processing device, operatively coupled to the memory device, to perform operations comprising:
responsive to receiving an interrupt deferral instruction requesting that interrupts be deferred, disabling delivery of interrupts by the processing device;
receiving one or more interrupt requests subsequent to disabling delivery of interrupts; and
responsive to determining that a deferral termination criterion is satisfied, delivering one or more interrupts, wherein each of the one or more interrupts is specified by a respective one of the interrupt requests, and wherein the deferral termination criterion is satisfied if an execution time of an application since receiving the interrupt deferral instruction exceeds a predefined fraction of a scheduling quota associated with the application.

17. The system of claim 16, the operations further comprising:
receiving a resume interrupt delivery instruction requesting that deferred and subsequent interrupts be delivered, wherein the deferral termination criterion is satisfied in response to receiving the resume interrupt delivery instruction.

18. The system of claim 17, the operations further comprising:

responsive to receiving the resume interrupt delivery instruction, enabling delivery of the one or more interrupts and subsequent interrupts by the processing device.

19. The system of claim 17, wherein the interrupt deferral instruction and the resume interrupt delivery instruction are called by program code executing in an unprivileged mode of the processing device.

20. The method of claim 1, wherein the interrupt deferral instruction is invoked by a first execution thread, the method further comprising:
   accessing, by the first execution thread, a shared resource that is also accessible by a second execution thread.

* * * * *